United States Patent [19]

Righi

[11] Patent Number: 5,315,866
[45] Date of Patent: May 31, 1994

[54] INDICATING DEVICE, ESPECIALLY FOR INDICATING THE STATE OF PRESSURE OF A TIRE

[75] Inventor: Nardino Righi, Cologno Monzese, Italy

[73] Assignee: Eurafrica Videomatic S.R.L. Societa Per Ricerche, Milan, Italy

[21] Appl. No.: 35,955

[22] Filed: Mar. 23, 1993

[30] Foreign Application Priority Data

Apr. 2, 1992 [IT] Italy .......................... GE92A000036

[51] Int. Cl.⁵ ............................................. B60C 23/02
[52] U.S. Cl. ...................................... 73/146.5; 336/30
[58] Field of Search ............................ 73/146.5, 146.2; 336/30; 340/442; 331/65

[56] References Cited

U.S. PATENT DOCUMENTS

| | | | |
|---|---|---|---|
| 4,450,716 | 5/1984 | Lefaucheux et al. | 73/146.5 |
| 4,742,712 | 5/1988 | Kokubu | 73/146.5 |
| 5,190,247 | 3/1993 | Le Chatelier | 73/146.5 |

*Primary Examiner*—Richard E. Chilcot, Jr.
*Assistant Examiner*—William L. Oen
*Attorney, Agent, or Firm*—Larson and Taylor

[57] ABSTRACT

The invention relates to an indicating device, especially for indicating the state of pressure of a tire, of the type that can be fixed to a wheel. The device includes: a mechanism (7) for measuring the pressure of the tire (2); a transducer/transmitter (8) which converts the measured magnitude of the pressure into an electrical signal and transmits the electrical signal to an electronic unit; and a source of electrical power (12, 13) for the transducer/transmitter (8). In order to make the device not only more practical and operationally reliable but also less expensive, the device provides an electrical power source, the power source consists of an inductive current generator formed by a rotor (12) which is fixed coaxially to the wheel so as to rotate as one piece therewith, and by a coaxial stator (13) which is freely rotatable with respect to the rotor (12) and is provided with a counterweight (14), capable of keeping the stator (13) essentially motionless with respect to the rotor (12) as the rotor rotates with the wheel.

29 Claims, 3 Drawing Sheets

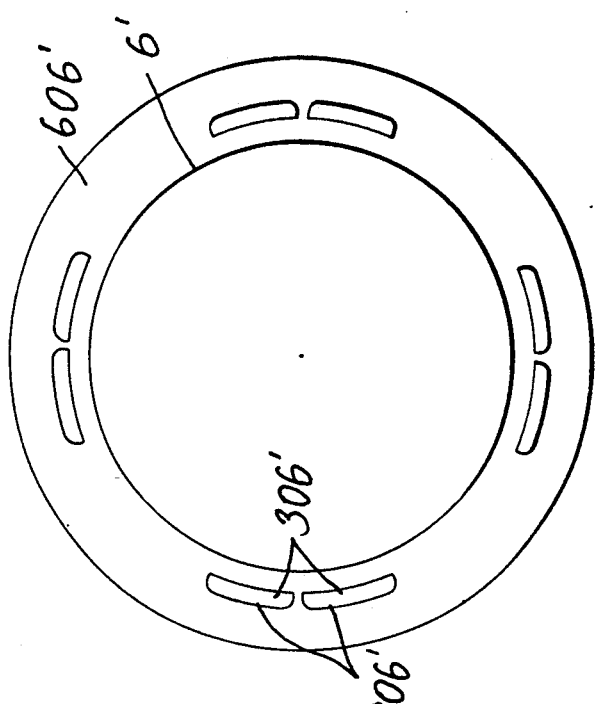
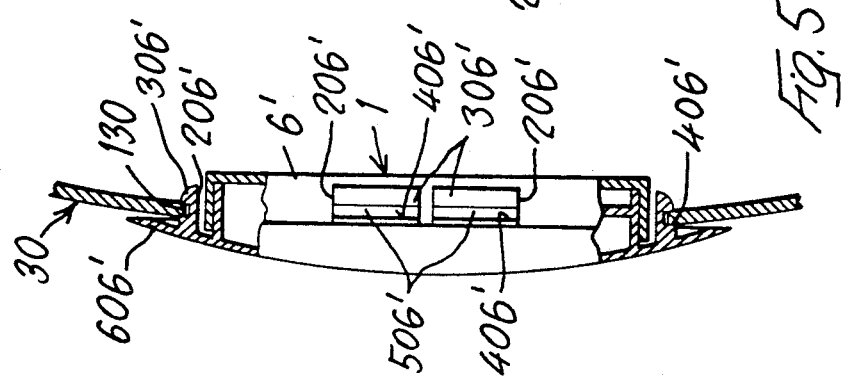
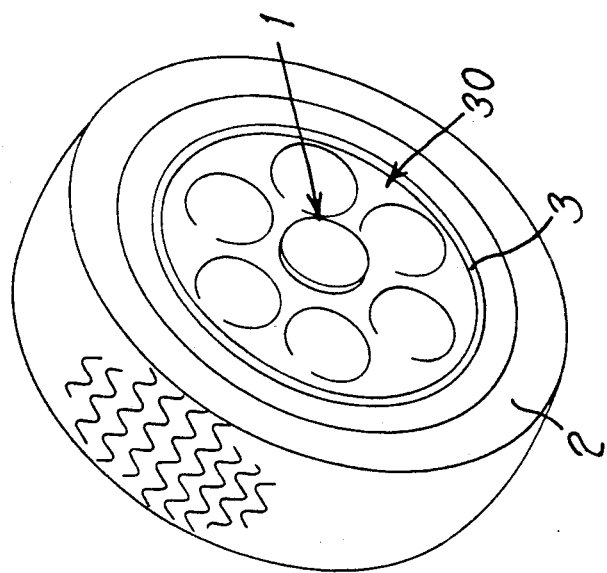

INDICATING DEVICE, ESPECIALLY FOR INDICATING THE STATE OF PRESSURE OF A TIRE

The invention relates to an indicating device, especially for indicating the state of pressure of a tire, of the type that can be fixed to a wheel and comprises means for measuring the pressure of the tire; a transducer/transmitter which converts the measured magnitude of the into a corresponding electrical signal and transits the signal to an electronic unit; and a source of electrical power for the transducer/ transmitter.

In these kinds of indicators, one of the main problems is where the electrical power supply should be located. Since the indicators are mounted directly on the wheel, that is on a revolving part, the use of those sources of electrical energy attached to the vehicle involves an increased expenditure in terms of construction and maintenance and high production costs.

It is the object of the invention to provide an indicating device, especially for indicating the state of pressure of a tire of the type described at the beginning, whose power source must be extremely reliable, structurally simple and robust, occupying very little space and costing as little as possible.

The invention achieves the above objects in the form of an indicating device especially for indicating the state of pressure of a tire, whose electrical power source consists of an inductive current generator formed by a rotor which is fixed coaxially to the wheel rotatably therewith and by a coaxial stator which is freely rotatable with respect to the rotor and is provided with at least one counterweight capable of keeping the stator essentially motionless with respect to the rotor and of overcoming the magnetic forces of attraction between the stator and the rotor as the rotor rotates with the wheel.

In a further improvement, in order to prevent the counterweight from swinging, for example during acceleration and deceleration, the counterweight is connected dynamically to damping means which damp said swinging movements, that is means for dissipating the accumulated kinetic energy.

Advantageously, the winding in which the electrical current is induced is part of the rotor and is fixed coaxially to the wheel so as to describe no relative movement with respect thereto, while the stator consists of a permanent, especially a multipolar, magnetic part.

The advantages of the invention are obvious from the above. By using the kinetic energy of rotation of the wheel and the force of gravity and inertia to generate electrical current, a source of electrical power for the indicating device has been provided which avoids all the problems relating to the construction of electrical contacts between relatively revolving parts and whose life is not limited in time. This problem has been eliminated with regard also to the generator itself since the induction coils are attached to the rotor and revolve with the wheel, whereas it is the stator, which is formed by the permanent magnetic part, that forms a relative rotary movement with respect to the wheel. The parts in relative movement are only the supports of the spindle of the stator which can easily and economically be made sufficiently robust and durable. The means for damping the swinging motion of the counterweight prevent the appearance of secondary effects which can lead either to a drastic reduction in the amount of electrical energy produced or to the complete prevention of its generation, because if there were no such means provided, the swinging motion could lead to a reduction in the inertial rest state of the counterweight owing to the progressive accumulation of kinetic energy. This could bring about a dynamic coupling between the wheel and the counterweight so that the counterweight and the stator begin to rotate with the rotor and with the wheel. The indicating device is easy and cheap to produce and occupies very little space.

The invention also relates to other features which further improve the indicating device set out above.

The particular features of the invention and the advantages procured thereby will be explained in greater detail in the description of a preferred embodiment, which is illustrated by way of a non-restricting example in the accompanying drawings in which:

FIG. 4 is a view similar to FIG. 1 of a variant of the device according to the invention which may be fitted to a rim cover or to a hubcap of the type that is fixed coaxially to the rim itself.

FIG. 5 shows a cross section of the device shown in FIG. 4 mounted on a rim cover or a hubcap.

FIG. 6 is an elevation of the rear of the device according to the preceding FIGS. 4 and 5.

Figure 2:
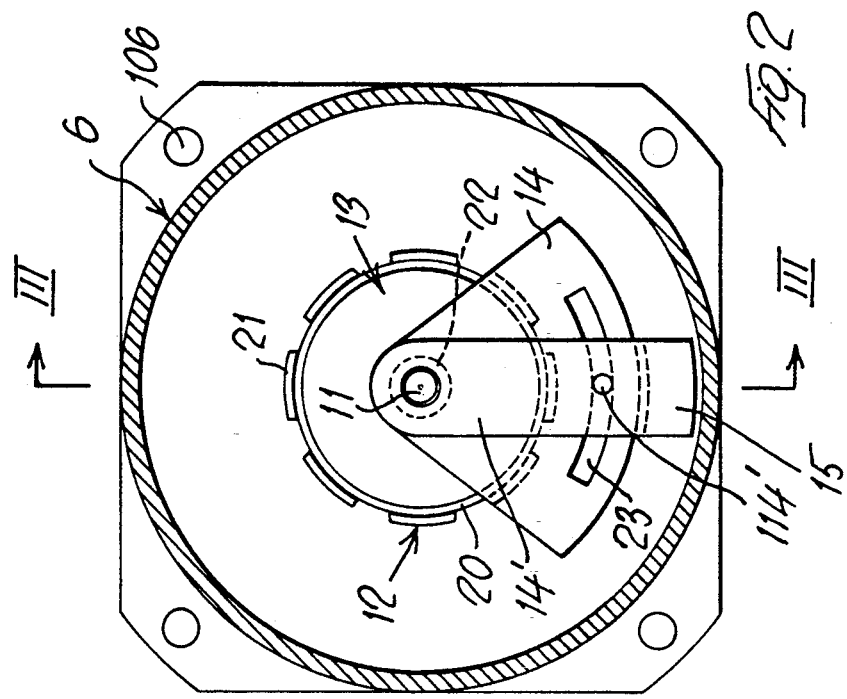
FIG. 2 shows a diagrammatic front elevation of the device shown in FIG. 1, with the box open.
Figure 1:
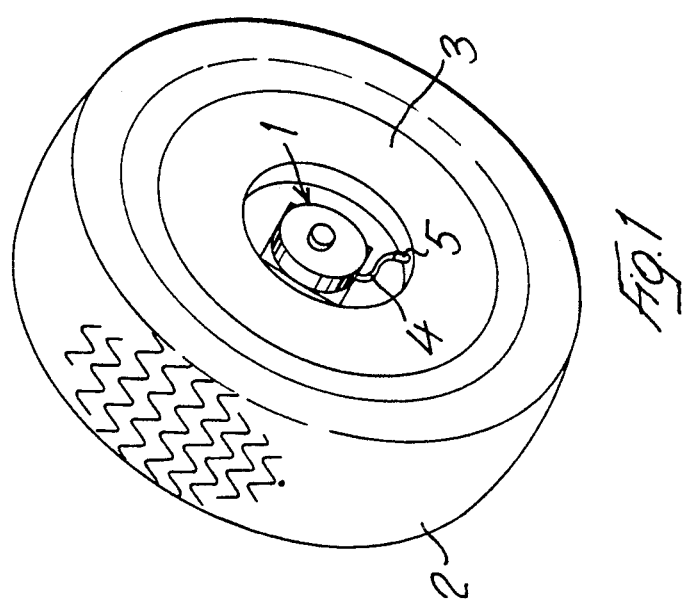
FIG. 1 is a diagrammatic perspective view of a wheel fitted with the indicating device for indicating the state of pressure of the tire according to the invention.

The indicating device 1 for indicating the state of pressure of a tire 2 is fitted to the rim 3 of the wheel in an exactly coaxial position. It is connected stably by means of a connecting tube 4 to the tire 2 inflation valve 5.

Figure 3:
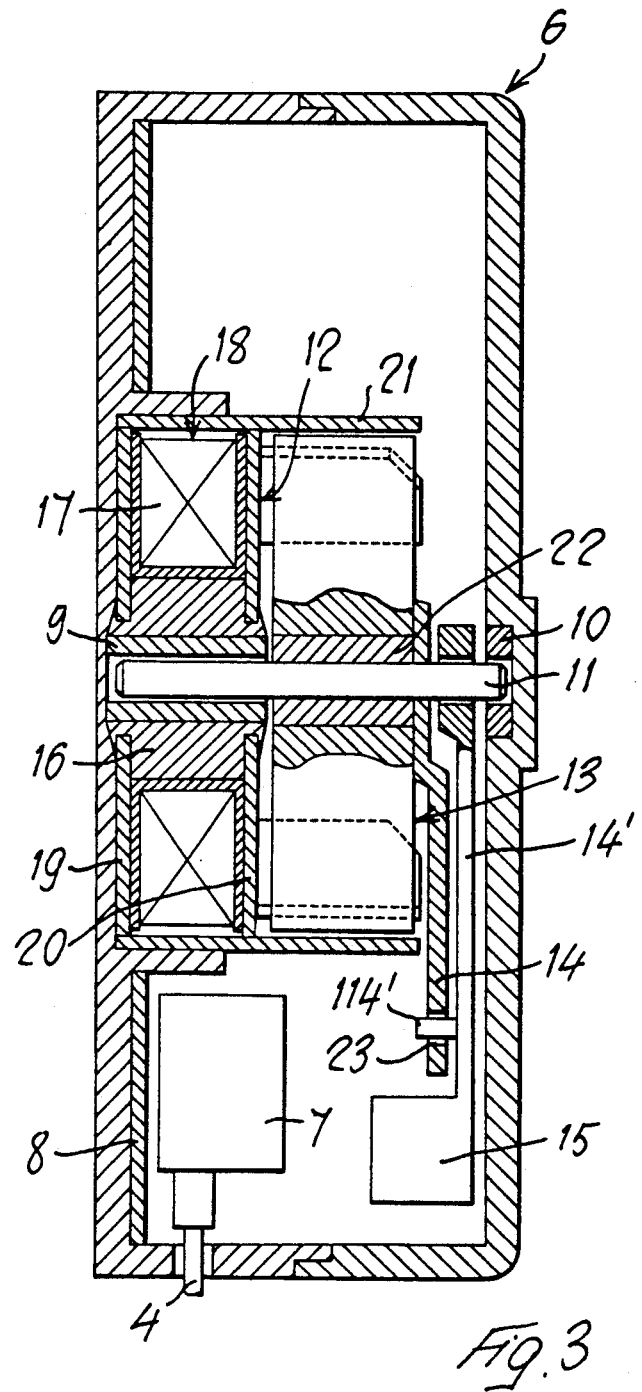
FIG. 3 shows an enlarged section taken through the line III—III seen in FIG. 2.

With reference to FIGS. 2 and 3, the device consists of an openable box 6 provided with holes 106 for fixing it to the rim 3 of the tire 2. The fixing holes 106 are advantageously provided in external extensions of the box 6. The box 6 houses a pressure measuring device 7 to which the connecting tube 4 is connected and a transducer/transmitter 8 of which only the printed circuit is shown in FIG. 3. The transducer/transmitter 8 converts the measured signals generated by the pressure gauge 7 into electrical signals and transmits them to an electronic unit installed in the driver's compartment (not shown). Supported freely rotatably in bushes or bearings 9, 10 in the box 6 is a coaxial spindle 11 which extends from one side to the other of the box 6. Mounted coaxially on the spindle 11, and freely rotatable about it, is a rotor, indicated as a whole by the reference 12, which forms part of a rotating electrical current generator intended to produce the electrical energy for the recharging of rechargeable batteries by which the transducer/transmitter 8 is powered. The rotor 12 is fixed stably to the side of the box 6 secured to the wheel rim 3. When mounted on the wheel, the spindle 11 and the rotor 12 are arranged coaxially with its axis of rotation and the box 6 with the rotor 12 are coupled in rotation to the wheel about the spindle 11. Mounted on the rotatable spindle 11, and rotatable with it, is a stator 13. The stator is arranged directly alongside the rotor 12. Fixed integrally to the furthest face of the stator 13 from the rotor 12 is a radial extension 14 forming a counterweight giving the stator 13 an inertial rest state sufficient for it to remain motionless, reliably overcoming the forces of magnetic attraction acting between the rotor 12 and the stator 13. The radial extension 14 is formed by a plate in the form of a sector of a circle coaxial with the axis of the stator 13 and spindle 11 and presenting an angular width of between 30° and 90°. The plate has a concentric arcuate slot 23 at a greater radial distance than the outer peripheral wall of the electrical generator. Superimposed on the radial extension 14 on its side furthest from the stator 13 is an arm 14' which is supported freely rotatably on the spindle 11. The arm 14' possesses a pin 114' projecting axially towards the radial extension 14 and engaging slidably within the arcuate slot 23 in the extension 14. The radial length of the arm 14' is greater than that of the radial extension 14 and less than that of the box 6. The arm 14' carries a weight 15 at its free end. The weight 15 projects axially towards the radial extension 14 and lies externally over the peripheral edge of the radial extension 14 at a certain distance from this edge. It may be made in the form of an axial fin which is suitably arcuate concentrically with the spindle 11 both on its radially outward side and on its radially inward side. The component formed by the weight 15 and the arm 14' weigh approximately the same as the radial extension 14 and form a second counterweight which is movable relative to the first in both directions of rotation through a small angle. By this means the second counterweight efficiently damps the swinging movement of the first counterweight, that is of the radial extension 14, which movement is particularly present during acceleration and deceleration of the rotary motion of the wheel and may cause the stator 13 and extension 14 also to rotate in the same direction as the wheel, causing either a reduction in the amount of energy produced or an interruption in the production of energy.

With particular reference to FIG. 3, the rotor 12 is formed by a generally cylindrical ferromagnetic core 16, especially an iron core, which advantageously also forms the housing of the bush 9 in which the spindle 11 is supported. Fixed round the ferromagnetic core 16, without the possibility of relative rotation and with the aid of an insulating coil 17, is an annular winding 18 in which the electrical current is induced. The winding 18 is interposed between two ferromagnetic discs 19, 20, of which the disc 19 furthest from the stator 13 carries a peripheral ring of axial extensions 21 pointing towards the stator 30 and equidistant from each other. The extensions 21 embrace the stator 13 around its periphery at a very small distance therefrom. The stateor 13 consists of an annular permanent multipolar magnet of a type readily available on the market. It is mounted on a plastic core 22 for non-rotatable fixing to the spindle 11. The multipolar magnet has many equidistant peripheral poles with alternating polarities. Advantageously, the number of magnetic poles of the multipolar magnet corresponds to the number of extensions 21 of the rotor. The electrical current is induced in the winding 18 of the rotor 12 by exploiting the rotational energy of the wheel and the force of gravity by which the stator 13 is kept more or less motionless, by virtue of the changes in the magnetic flux to which the winding 18 is subject during the relative rotation of the annular multipolar magnet of the stator 13 and of the ferromagnetic ring of extensions 21 of the rotor 12.

A further feature of the invention is that the current generator is generally cylindrical in form, while the box 6 comprises a housing chamber that is also cylindrical in form and coaxial with the generator, its radius being slightly greater than that of the component formed by the arm 14' and the weight 15. The dimensions of the whole assembly are such that the radial extension 14 and the component formed by the arm 14' and the weight 15 do not interfere with the measuring means 7 and with the transducer/transmitter 8, these being housed in the remaining peripheral annular part of the cylindrical chamber.

The device therefore has not only the advantages described above but also great structural simplicity and very small space requirements. Consequently costs are very low and the device operates both reliably and efficiently, avoiding the use of moving contacts or exhaustible sources of electrical power.

FIGS. 4 to 6 show an alternative embodiment of the device 1 according to the invention, in which the device comprises not only the box 6' but also a covering part for the outward side of the rim, with any desired radial extension, for example a rim cover 30 or a hubcap. The box 6' is fixable by snap-on means coaxially with the wheel on the outward side of the rim cover 30 or, alternatively, partly or wholly recessed into it. The rim cover 30 may be fixed to the wheel by any means.

The fixing means of the box 6' are a coaxial peripheral ring of axial fixing lugs 206', which in the example shown comprises eight fixing lugs 206' arranged in pairs, the pairs being set out in the form of a cross. The free ends of the fixing lugs 206' project towards the rear side of the box 6' and yield elastically radially towards the middle. At its free end, each possesses a terminal catching tooth 306' which projects from the radially outward side of the end and whose radially outward side tapers towards the free end. The lugs 206' are preferably arcuate to correspond to the radius of the ring formed by them and the tooth 306' runs along their full angular width. The fixing lugs 206' are intended to snap into coinciding slots in the rim cover 30.

In the embodiment shown, in the place of the slots, the rim cover 30 has a window whose shape is basically complementary to the shape of the box 6' in plan, or at least of the rear part of this box and which window is coaxial with the wheel when the rim cover 30 is mounted. In this case, as FIG. 5 shows, the teeth 306' engage behind the edge 130 of the window. The lugs 206' are on an external annular flange 606' on the front side of the box 6'. These lugs extend parallel to the peripheral side of the box 6' and are separated from it radially outwardly by a sufficient distance to avoid interference between the lugs 206' and the peripheral side, ensuring that the lugs can bend radially inwards when the box 6' is being fitted to the rim cover 30. The axial length of the lugs 206' is such that they do not project beyond the rear side of the box 6'. The lugs 206' preferably terminate slightly short of the rear side. Consequently, when mounted on the rim cover 30, the box 6' is partly recessed into it and extends partly outwards from the rim cover 30. Its front side is advantageously convex towards the outside and joins smoothly to the peripheral flange 606' which tapers substantially against the adjacent part of the rim cover 30.

By way of an improvement, to make it possible to fix the box 6' firmly also in the axial direction towards the wheel, at a distance corresponding approximately to the thickness of the edge 130 of the window in the rim cover 30, each lug 206' comprises an outward radial step opposite to the tooth 306'. In this way the edge 130 snap fastens between the tooth 306' and the step 406', preventing any axial translation in either direction of the box 6.

Advantageously, as shown in FIG. 5, the tooth 306' and the opposite step 406' are formed in the lugs 206' by means of a groove 506' cut into the radially outward side of these lugs, the width of this groove 506' corresponding approximately to the thickness of the edge 130 of the window.

I claim:

1. An indicating device for indicating a pressure in a tire, which tire is mounted on a rim to form a wheel which has a rotation axis, the device being mounted on the wheel and comprising;
    a means for measuring the pressure in the tire;
    a transducer/transmitter means for converting the measured pressure of the tire to an electrical signal and for transmitting this signal to an electrical unit; and
    a source of electrical power for said transducer/transmitter means forming an inductive current generator when the wheel rotates, said source including
        a rotor which is fixed to the wheel coaxially to the axis of the wheel so as to rotate with the wheel,
        a stator which is mounted coaxial with the axis of the wheel so as to be substantially freely rotatable relative to said rotor and about the axis,
        a first counterweight which is fixed relative to said stator such that, as the wheel and said rotor turn together, said first counterweight keeps said stator substantially motionless with respect to said rotor as said first counterweight overcomes a force of magnetic attraction between said stator and said rotor, and
        a damping means for damping swinging movement of said first counterweight as the wheel rotates, said damping means including a second counterweight, a mounting means for mounting said second counterweight for free rotation about the axis of the wheel and axially adjacent said first counterweight, and a coupling means for coupling said first counterweight and said second counterweight together to permit only a limited angular displacement about the axis between said first and second counterweights.

2. An indicating device as claimed in claim 1 wherein said rotor includes a winding coaxial with the axis in which a current is induced; and wherein said stator is a permanent, multipolar magnetic element.

3. An indicating device as claimed in claim 2 wherein said stator and said rotor are arranged coaxially alongside one another.

4. An indicating device as claimed in claim 3 wherein said magnetic element includes a periphery comprising a series of equidistantly spaced magnetic poles with alternating polarities.

5. An indicating device as claimed in claim 4 wherein said rotor further includes a ferromagnetic part having a circular periphery coaxial with the axis and a series of radially spaced extensions extending from the periphery of said part parallel to the axis and axially about said magnetic element but radially spaced a slight distance therefrom.

6. An indicating device as claimed in claim 5 wherein a number of said extensions of said rotor matches a number of said magnetic poles of said stator.

7. An indicating device as claimed in claim 6 wherein said part forms a box in which said winding is housed.

8. An indicating device as claimed in claim 7 wherein said part further includes a cylindrical core coaxial with the axis, two coaxial discs fixed to opposite ends of said cylindrical core such that said winding is located about said cylindrical core between said discs and such that said extensions extend across both of said discs to said stator; and wherein said multipolar magnetic element is annular shaped.

9. An indicating device as claimed in claim 8
    further including a housing and a means for fixing said housing to the rim of the wheel; and
    wherein said housing includes a front wall and a back wall, a second mounting means for mounting said rotor to said back wall, a first bearing located coaxially in said cylindrical core, a second bearing attached coaxially to said front wall, and a spindle to which said stator is fixed which is received in and extends between said first and second bearings such that said spindle and said stator are rotatable coaxially relative to said rotor and said box.

10. An indicating device as claimed in claim 1 wherein said first counterweight is a radial extension non-rotatbly fixed to a side of said stator furthest from said rotor.

11. An indicating device as claimed in claim 10 wherein said extension is a plate shaped as a sector of a circle concentric with the axis and having an angular width of 30 to 90 degrees and a radial length greater than that of said stator and of said rotor.

12. An indicating device as claimed in claim 1
    further including a housing, a means for fixing said housing to the wheel, and a spindle to which said stator is mounted for rotation therewith which is mounted coaxial with the axis in said housing for free rotation relative to said housing;
    wherein said first counterweight includes an arcuate guide concentric with the axis and having limit stops at each end thereof; and
    wherein said second counterweight is an arm having (a) a radial length greater than that of said first counterweight, (b) a first end which is mounted to said spindle for free rotation relative thereto, (c) a second end distal from said first end which is weighted, and (d) a cursor extending axially into said arcuate guide for slidable movement therein between said limit stops.

13. An indicating device as claimed in claim 12 wherein said second weighted end of said arm is a radial fin projecting axially toward said rotor and lying peripherally over an outer edge of said first counterweight, said radial fin having inner and outer walls which are arcuate about the axis.

14. An indicating device as claimed in claim 13 wherein said arcuate guide of said first counterweight is an arcuate slot formed in said first counterweight; and wherein said cursor of said second counterweight is a pin projecting into said arcuate slot.

15. An indicating device as claimed in claim 1 wherein said first and second counterweights have weights which are about equal.

16. An indicating device as claimed in claim 1 and further including a cylindrical housing and a means for fixing said housing to the wheel coaxial with the axis, said housing closely enclosing in a radial direction said measuring means, said transducer/transmitter means, and said source.

17. An indicating device as claimed in claim 1 wherein said transducer/transmitter means includes a transformer circuit which directly receives a generated current from said source.

18. An indicating device as claimed in claim 1 and further including a rechargeable battery which directly receives a generated current from said source and which powers said transducer/transmitter means.

19. An indicating device as claimed in claim 16 wherein said housing includes a part extending radially therefrom which contacts an external surface of the wheel; and wherein said fixing means fixes said housing to the wheel with said part contacting the external surface.

20. An indicating device as claimed in claim 19 wherein said fixing means includes snap actuated elements.

21. An indicating device as claimed in claim 20 wherein the wheel includes a wheel cover; and wherein said fixing means attaches said housing to the wheel cover.

22. An indicating device as claimed in claim 21 wherein the wheel cover includes a central recess in which said housing is received; and wherein said fixing means fixes said housing partially in the recess with said part located about the recess.

23. An indicating device as claimed in claim 22 wherein said snap actuated elements of said fixing means includes at least two diametrically opposite fixing lugs integral with said housing and extending axially from said part, said lugs being elastically flexible and having a free end and a tooth extending radially from said free end.

24. An indicating device as claimed in claim 23 wherein the wheel cover is provided with slots; and wherein said lugs of said fixing means pass through the slots in the wheel cover so that respective said teeth of said lugs are trapped behind respective slots.

25. An indicating device as claimed in claim 23 wherein the wheel cover is provided with an aperture defined by an edge of the wheel cover, said housing being received in the aperture until said part contacts the wheel cover; and wherein said fixing means includes a series of said lugs provided coaxially about said housing with said teeth of said lugs extending radially outward so that during insertion of the housing in the aperture said teeth pass behind the edge of the wheel cover and are thus trapped behind the edge.

26. An indicating device as claimed in claim 25 wherein said part of said housing is a peripheral flange provided at an outward front side of said housing, and wherein said series of lugs are integral with said flange and extend axially from said flange.

27. An indicating device as claimed in claim 26 wherein said series of lugs comprises eight of said lugs arranged in pairs, said pairs being located at 90° intervals peripherally about said flange.

28. An indicating device as claimed in claim 27 wherein each of said lug also includes an outward radial step spaced axially from said tooth by a distance which is substantially the same as an axial thickness of the edge of the wheel cover.

29. An indicating device as claimed in claim 28 wherein each said lug includes a radially outward peripheral groove which forms said tooth and said step.

* * * * *